(12) United States Patent
Blaschka et al.

(10) Patent No.: US 11,065,721 B2
(45) Date of Patent: Jul. 20, 2021

(54) METHOD FOR DETERMINING THE REFERENCE FOCAL POSITION OF A LASER BEAM

(71) Applicant: TRUMPF Werkzeugmaschinen GmbH + Co. KG, Ditzingen (DE)

(72) Inventors: Markus Blaschka, Schoenaich (DE); Dieter Hallasch, Ditzingen (DE); Markus Zimmermann, Leinfelden-Echterdingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 249 days.

(21) Appl. No.: 16/003,239

(22) Filed: Jun. 8, 2018

(65) Prior Publication Data

US 2018/0290242 A1 Oct. 11, 2018

Related U.S. Application Data

(63) Continuation of application No. PCT/EP2016/080021, filed on Dec. 7, 2016.

(30) Foreign Application Priority Data

Dec. 11, 2015 (DE) .................... 102015224963.8

(51) Int. Cl.
*B23K 26/073* (2006.01)
*B23K 26/38* (2014.01)
(Continued)

(52) U.S. Cl.
CPC ............ *B23K 26/38* (2013.01); *B23K 26/032* (2013.01); *B23K 26/046* (2013.01);
(Continued)

(58) Field of Classification Search
USPC ..... 219/121.72, 121.83; 359/368, 201.1, 385
See application file for complete search history.

(56) References Cited

U.S. PATENT DOCUMENTS 4,553,845 A * 11/1985 Kuroki ................. G03F 9/7088
356/400
4,583,854 A * 4/1986 Lozar .................. G01B 11/022
250/224

(Continued)

FOREIGN PATENT DOCUMENTS

| CN | 1703298 A | 11/2005 |
| CN | 101208171 A | 6/2008 |

(Continued)

OTHER PUBLICATIONS

International Search Report and Written Opinion in International Application No. PCT/EP2016/080021, dated Aug. 24, 2017, 14 pages (with English translation).

(Continued)

*Primary Examiner* — Tu B Hoang
*Assistant Examiner* — Masahiko Muranami
(74) *Attorney, Agent, or Firm* — Fish & Richardson P.C.

(57) ABSTRACT

A method for determining a reference focal position of a laser beam for processing a plate-like member, the method comprising producing at least two incisions in the plate-like member with the laser beam set at different focal positions, irradiating the plate-like member with the laser beam, detecting edges of the incisions by measuring one or more parameters relating to the irradiation of the plate-like member, and establishing a width of the at least two incisions using the detected one or more parameters.

11 Claims, 3 Drawing Sheets

(51) Int. Cl.
*B23K 26/046* (2014.01)
*B23K 26/064* (2014.01)
*B23K 26/03* (2006.01)
*G01B 11/02* (2006.01)

(52) U.S. Cl.
CPC ........ *B23K 26/064* (2015.10); *B23K 26/0738* (2013.01); *G01B 11/028* (2013.01)

(56) References Cited

U.S. PATENT DOCUMENTS

| | | | | |
|---|---|---|---|---|
| 6,215,094 | B1* | 4/2001 | Dausinger | B23K 26/032 219/121.62 |
| 6,437,283 | B1* | 8/2002 | Wiggermann | B23K 26/0604 219/121.7 |
| 6,713,718 | B1* | 3/2004 | Lu | B23K 26/032 219/121.69 |
| 2006/0138111 | A1* | 6/2006 | Hillebrand | B23K 26/04 219/121.83 |
| 2008/0011726 | A1* | 1/2008 | Seo | H01L 21/0268 219/121.81 |
| 2008/0180657 | A1* | 7/2008 | Scholich-Tessmann | B23K 26/04 356/123 |
| 2009/0266989 | A1* | 10/2009 | Schwarz | G01B 11/24 250/358.1 |
| 2010/0200552 | A1* | 8/2010 | Mienhardt | B23K 26/046 219/121.72 |
| 2013/0319980 | A1* | 12/2013 | Hesse | B23K 31/125 219/121.62 |
| 2014/0104600 | A1* | 4/2014 | Rathjen | B23K 26/0624 356/123 |
| 2014/0332677 | A1* | 11/2014 | Fujiwara | A61B 1/063 250/234 |

FOREIGN PATENT DOCUMENTS

| | | |
|---|---|---|
| CN | 101687280 A | 3/2010 |
| CN | 204725003 U | 10/2015 |
| CN | 105034607 A | 11/2015 |
| DE | 102 55 628 | 7/2004 |
| EP | 1 750 891 | 2/2007 |
| JP | 562263889 A | 11/1987 |
| JP | S62263889 A | 11/1987 |
| JP | H07214357 A | 8/1995 |
| JP | H1076384 | 3/1998 |
| JP | 10258382 A | 9/1998 |
| JP | H10-258382 A | 9/1998 |
| JP | H10 314966 | 12/1998 |
| JP | 2004066321 A | 3/2004 |
| JP | 2006-191139 A | 7/2006 |
| JP | 2008-290117 A | 12/2008 |
| JP | 2009-229266 A | 10/2009 |
| WO | WO 2009/046786 | 4/2009 |

OTHER PUBLICATIONS

JP Office Action in Japanese Appln. No. 2018-529942, dated May 22, 2020, 8 pages (with English translation).
KR Office Action in Korean Appln. No. 10-2018-7019552, dated Feb. 3, 2020, 8 pages (with English translation).
KR Office Action in Korean Appln. No. 10-2018-7019552, dated Dec. 3, 2020, 7 pages (with English translation).
CN Office Action in Chinese Appln. No. 201680072621.8, dated Sep. 12, 2019, 17 pages (with English translation).
JP Office Action in Japanese Appln. No. 2018-529942, dated Sep. 12, 2019, 6 pages (with English translation).

* cited by examiner

METHOD FOR DETERMINING THE REFERENCE FOCAL POSITION OF A LASER BEAM

TECHNICAL FIELD

The invention relates to methods for determining a reference focal position of a laser beam of a laser installation.

BACKGROUND

To process workpieces in a sufficiently precise manner, whether it be by laser cutting or laser welding, it is necessary to bring the portion of the laser beam that has the highest power density into contact with the workpiece. To find the narrowest location of a laser beam it is known, for example, to cut different slots in a reference workpiece using the laser beam with a different focal position used for each slot. Subsequently, the reference workpiece is removed and the slot widths are measured manually. The focal position with which the smallest slot width was achieved is the focal position most suitable for a workpiece processing operation. This method is relatively complex and has not been automated.

From DE 102 55 628 A1, it is known to measure the cutting gap width of lines that are cut with different focal positions in a test workpiece using a camera.

JP H1076384 A discloses a method for determining the focal position by cutting a plurality of lines with different focal positions in a workpiece. Subsequently, the cutting head is moved transversely over the lines and the line width is measured in a capacitive manner using a distance sensor.

From EP 1 750 891 B1, there is known a method for determining the focal position in which, by repeated movement over a cutting gap with a changed focal position and the detection of the process radiation, it is established at which focal position the cutting gap has the minimal width.

From WO 2009/046786 A1 a method is known for determining the focal position of a laser beam by cutting a continuous line with a varying focal position and subsequent lateral scanning of the cut line. The scanning can be carried out mechanically, capacitively, or by the laser beam.

SUMMARY

The present disclosure provides alternative methods to determine the correct focal position of laser beams of laser installations in a simple manner using components that are already present in the laser installation. This advantage is achieved with methods for determining the focal position of a laser beam of a laser installation suitable for a workpiece processing process, having the steps of:

a. producing at least two incisions with the laser beam of the laser installation in a plate-like member, wherein different focal positions are set for the at least two incisions;
 b. irradiating the plate-like member with the laser beam;
 c. detecting edges of the incisions by one or more parameters relating to the irradiation of the plate-like member being detected;
 d. establishing the width of the incisions using the parameter(s) detected, e.g., from the spacing of the edges detected using the parameter(s) detected.

The reference focal position of the laser beam is, for example, the focal position at which the beam focus is located on the workpiece surface (i.e., on the surface of the plate-like member). The spacing of the laser nozzle from the surface of the plate-like member and/or the focusing device of the laser processing head are then adjusted in such a manner that the beam focus of the laser beam rests on the surface of the plate-like member. With this information (the spacing or the adjustment of the focusing device at which the beam focus is located on the surface of the plate-like member), it is possible to adjust to a desired focal position with subsequent workpiece processing operations.

To determine the reference focal position, a plurality of parallel incisions are cut in a reference workpiece (e.g., a plate-like member) with variable focal position settings. After cutting the incisions in the plate-like member (e.g., a reference metal sheet), the plate-like member is again irradiated with the laser beam, but not for cutting. If the laser beam strikes the material of the plate-like member at the incisions, process radiation and/or a reflected laser radiation occurs. Process radiation may be detected, for example, using a piercing sensor system, which is already present on a laser installation. Reflected laser radiation may be detected, for example, using a protective glass monitoring device that is already present. The parameters that are detected in this manner, process radiation and/or reflected radiation, can be evaluated by an evaluation algorithm to detect the edges of the incisions. By another algorithm, the edge information can subsequently be processed to automatically determine the width of the incisions and the incision with the smallest width. The focal position associated with the incision with the smallest width then represents the reference focal position.

Since the laser beam of the laser installation is used as a light source for irradiating the plate-like member, no additional light source is required. It is consequently possible to calibrate the focal position on a laser installation with components that are already present. A laser installation already has a sensor system, which is required for controlled piercing and a connection of this sensor system to a central sensor technology control unit. The laser processing head, which is already present, can also be used to irradiate the plate-like member. The irradiation of the plate-like member can be carried out at a reduced laser power and at a laser frequency >10 KHz. The laser power can be just large enough that a process from which process light is emitted occurs. The more sensitive the available sensor system is, the lower the power can be.

Typically, the laser beam and the plate-like member are moved relative to each other transversely relative to the longitudinal direction of the incisions. In this instance, it is advantageous for the incisions to be located parallel to each other since consequently the laser beam and the plate-like member have to be moved only in one direction relative to each other.

Other advantages are afforded when the processing head, which orientates the laser beam with respect to the plate-like member, is moved with a constant spacing from, and at a constant speed relative to, the plate-like member. The speed may be selected such that the temporal resolution for scanning the edges of the incisions is sufficiently high. However, it should not be too low, because otherwise no clean/sharp/ steep edge is visible in the process light signal or in the signal of the reflected radiation when the laser beam strikes an edge of an incision. Furthermore, there is the risk that with excessively slow advance, the edges are already molten before being clearly detected. For example, the relative speed of the light source to the plate-like member may be 1 m/min.

The laser power for scanning the plate-like member should be high enough that a sufficiently strong process light level is generated when striking the material of the plate-like member. It is possible to adjust the laser power to such a high value that the material of the plate-like member between two incisions is cut.

The adjusted gas pressure of the laser installation should be as small as possible during the relative movement of the light source and plate-like member, for example, 0.3 bar. When the plate-like member is a metal sheet it is thus prevented from bending during measurement and negatively influencing the measurement.

To ensure a precise measurement, it is advantageous to cut the incisions to a width greater than a single cutting gap width. Doing so ensures that when the incisions are measured, the signal of the process radiation or the reflected laser radiation can fall to a minimum after moving over the first edge of the incision before increasing again when it strikes the workpiece material at the other edge of the incision. Consequently, the precision of the edge detection can be improved.

Particular advantages are afforded when the light source and the plate-like member are moved twice in opposing directions relative to each other, where for each relative movement only one of the edges of an incision is detected. With each movement direction, therefore, only one of the edges of an incision is detected. In this manner, the measurement precision is improved. In some instances, for each movement direction only the second edge of the incision in the movement direction is detected; that is, the upwards or increasing edge of an incision encountered by the laser beam when moving in the movement direction. Detecting only the upwards or increasing edge is advantageous, because the detection when "approaching" the edge is possible in an operationally reliable manner. To determine the incision widths, the position information from the outgoing and return travel then is combined. Between the individual "beam paths" (outgoing and return travel), a degree of safety distance is included so that the edge damage from scanning in one direction does not falsify the scanning in the other direction. Typically, the incisions therefore have a depth of >1 mm, or >1.5 mm.

In some embodiments, incisions can be produced by cutting a first single cutting gap with the laser beam in a longitudinal direction of the incision to be produced, subsequently making a second single cutting gap in a direction transverse to the longitudinal direction and then, making a third single cutting gap in the longitudinal direction but in an opposing direction to the production of the first single cutting gap until a portion of the plate-like member is cut out. It is thereby ensured that an incision is wider than a single cutting gap. A single cutting gap is produced in this case when the laser beam is moved only in one direction relative to the plate-like member. The width of the single cutting gap therefore substantially corresponds to the width or the diameter of the laser beam.

An edge of an incision can be detected when a detected parameter falls below or exceeds a first predetermined reference value. In some instances, the parameter can be the power of the process radiation and/or the reflected laser radiation. A reference value for the parameter can be predetermined and the parameter can be monitored to determine when it exceeds or falls below the reference value. An edge is detected when a crossing of the predetermined reference value by a parameter (e.g., the power of the process radiation or power of the reflected radiation) is identified.

Alternatively or additionally, an edge of an incision can be identified when a parameter gradient exceeds or falls below a second reference value. In particular, there may be provision for a gradient to be formed by a current parameter value (value of a parameter, for example, power of the process radiation, at a sampling point) being subtracted from a previous parameter value (value of the parameter at a previous sampling point). An edge can be identified when the value crosses (e.g., exceeds or falls below) the first and second predetermined reference values.

Alternatively or additionally, a gradient of the parameter (one or both of the power of the process radiation and the reflected laser radiation) can be calculated from a plurality of sampling points, a mean value of the gradients calculated, and compared with a third reference value. An edge of an incision is detected when the mean value exceeds or falls below the third reference value. The averaging can be carried out in such a manner that the sum of the gradients is divided by the number of sampling points used.

To mathematically evaluate the established widths of the incisions, a curve can be fit at the widths found from one or more of the reference values. The curve minima correspond to the minimum cutting gap width and the associated focal position, thereby determining the reference focal position.

In this manner, it can be seen when a single width does not correspond to the remaining ones, that is to say, it clearly deviates from the calculated curve. This width can be disregarded in the evaluation. By evaluating the precision of the curve fit (for example, via the mean squared errors), it is further possible to verify the measurement quality. When the sum of the deviations of the widths from the calculated curve is too great, a notification can indicate that the measurement has to be repeated.

Other features and advantages of the invention will be appreciated from the following detailed description of embodiments of the invention, with reference to the Figures of the drawings which sets out details which are significant to the invention, and from the claims. The features set out therein are not necessarily intended to be understood to be to scale and are illustrated in such a manner that the specific features according to the invention can be made clearly visible. The different features can be implemented individually per se or together in any combination in variants of the invention.

In the schematic drawings, embodiments of the invention are illustrated and explained in greater detail in the following description.

DESCRIPTION OF DRAWINGS

Like reference symbols in the various drawings indicate like elements.

DETAILED DESCRIPTION

Figure 1:
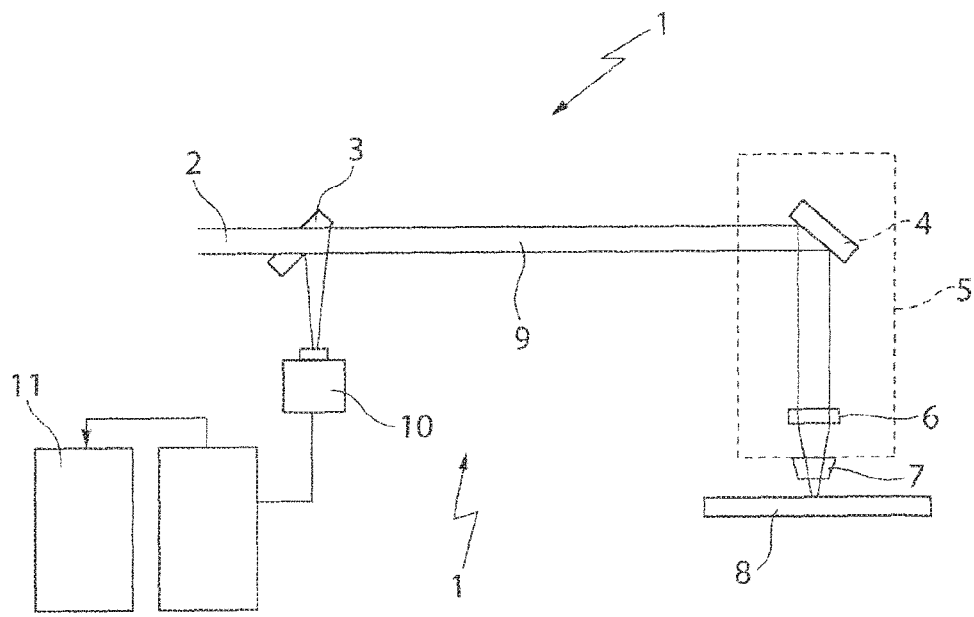
FIG. 1 is a schematic illustration of a portion of a laser installation.

FIG. 1 shows a laser installation 1, e.g., a laser cutting installation, where a laser beam 2 is directed by a mirror 3 (e.g., a scraper mirror) onto a redirection mirror 4 in a laser processing head 5. The laser beam 2 is focused by a focusing device 6 (e.g., a lens) and directed through a laser nozzle 7 onto a workpiece 8. When the laser beam 2 strikes the workpiece 8, process radiation is produced. This radiation is reflected back via the mirror 4 and decoupled by the mirror 3 from the laser beam path 9 and directed onto a measurement device 10. The measurement device 10 includes a photodiode with a corresponding electronic system. The data collected by the measurement device 10 is transmitted to an evaluation and control device 11. The evaluation and control device 11 carries out an edge detection process, which is described below.

During irradiation of the workpiece 8 with the laser beam 2, radiation is produced as process light (process radiation) and/or reflected laser radiation. The process light and the reflected laser radiation are parameters related to the irradiation of the workpiece 8, which are used in the edge detection process.

Figure 2:
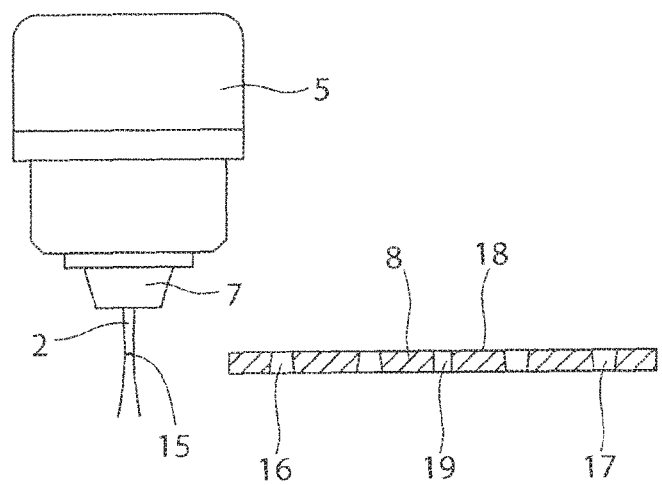
FIG. 2 is a schematic illustration that explains the concept of the focal position.

FIG. 2 is a schematic illustration of the laser processing head 5 with the nozzle 7. The laser beam 2 has at the location 15 the smallest diameter thereof (that is to say, the focal point). The location 15 therefore corresponds to the focal position. The focal position can be changed in relation to the surface of the workpiece 8 by moving the focusing device 6 and/or the spacing of the nozzle 7 (that is to say, the processing head 5) up or down relative to the workpiece 8. If the focal position 15 is above the workpiece 8, an opening 16 that expands downwards is produced in the workpiece 8. If the focal position 15 is below the workpiece 8, an opening 17 that expands upwards is produced. If the focal position 15 is located on the surface 18 of the workpiece 8, an opening 19 with substantially parallel side walls is produced. During the workpiece processing operation, the focal point of the laser beam 2 is typically on the upper side 18 of the workpiece 8 or inside the workpiece 8.

Figure 3:
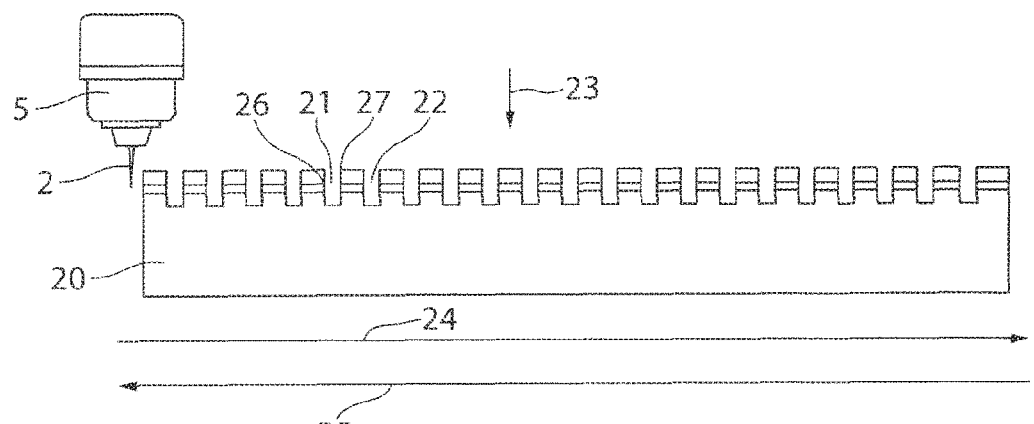
FIG. 3 is an illustration of a laser cutting head cutting a plate-like member.

FIG. 3 is a plan view of a plate-like member 20 in which a plurality of incisions 21, 22 have been produced by the laser beam 2 of the laser installation 1. The incisions 21, 22 were produced using different laser focal positions. Each of the incisions 21, 22 is wider than a single cutting gap width. The incisions 21, 22 were produced by the laser beam 2 first being moved in the longitudinal direction 23 of the incisions 21, 22 to be produced. Subsequently, the laser beam 2 was moved perpendicularly to the longitudinal direction 23 to produce the incisions 21, 22 and then moved counter to the arrow direction 23. To determine the width of the incisions 21, 22, the plate-like member 20, which is comb-like as a result of the incisions 21, 22, is again irradiated with the laser beam 2. During this irradiation, the laser beam 2 has a lower power than when the incisions 21, 22 are produced but high enough power for process light to be produced. To this end, the laser processing head 5 and the plate-like member 20 are moved relative to each other. In particular, the laser processing head 5 is moved across the plate-like member 20 in the arrow direction 24, that is to say, transversely relative to the longitudinal direction 23 of the incisions 21, 22 over the incisions 21, 22.

It is possible to move the laser processing head 5 relative to the plate-like member 20 only once and detect both edges 26, 27 of an incision 21, 22 extending in an arrow direction 23. However, an improved measurement result is obtained when the processing head 5 and the plate-like member 20 are moved twice relative to each other, e.g., the processing head 5 is first moved in arrow direction 24 relative to the plate-like member 20 and subsequently with an offset in arrow direction 25 from the path traced by the movement in arrow direction 24. During the movement in arrow direction 24, the edge 27 is detected and, during the movement in the arrow direction 25, the edge 26 is detected.

Figure 4:
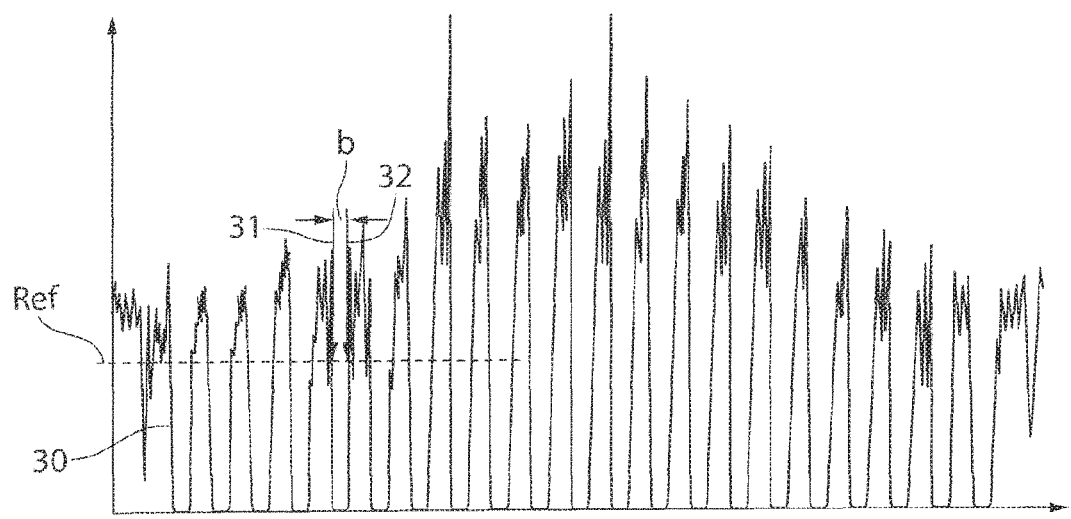
FIG. 4 is a graph illustrating edge detection.

FIG. 4 shows a parameter 30, e.g., the process light power, which is detected when the laser beam 2 is moved relative to the plate-like member 20. To detect the edge, it is established when the parameter 30 passes the reference value REF. The left edge 26 of the incision 21 is thus, for example, detected at the location 31 and the right edge 27 at the location 32, corresponding to where the parameter 30 exceeds or falls below the reference value REF. The spacing between these two locations 31, 32 produces the width b of the incision 21. In this manner, the width of all the incisions 21, 22 can be established. The focal position associated with the incision 21, 22, which has the smallest width, represents the reference focal position.

Additionally or alternatively, gradients of the parameter 30 could also be established and the gradients compared with a second reference value. An edge could thus be detected when the reference value REF is crossed or the second reference value is passed by the established gradient curve, or both reference values are passed at once.

Figure 5:
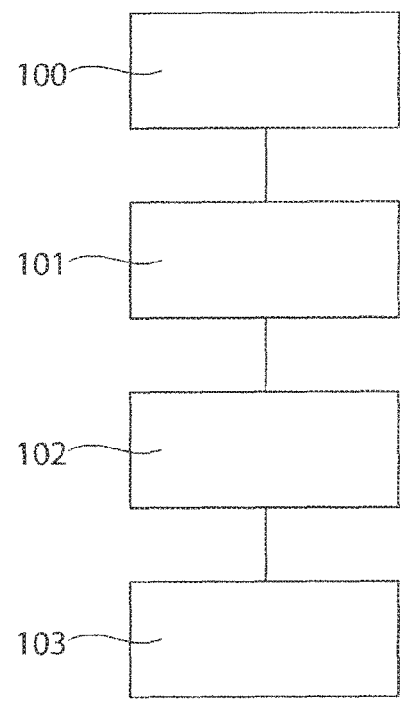
FIG. 5 is a flow chart illustrating the edge detection methods described herein.

In FIG. 5, a method of edge detection as described herein is illustrated schematically in a flow chart. In a first step 100, at least two incisions are produced with a laser beam of a laser installation in a plate-like member, with different focal positions set for the incisions. Subsequently, in step 101, an irradiation of the plate-like member is carried out using the laser beam, with the laser beam and the plate-like member moved relative to each other. In step 102, the edges of the incisions are detected by one or more parameters that are related to the irradiation of the plate-like member being detected. For example, the process light that is produced is detected. In step 103, the width of the incisions is established using the detected parameters.

Figure 6:
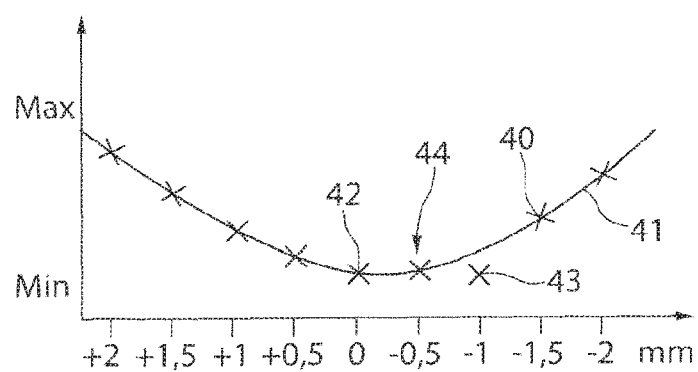
FIG. 6 is a graph illustrating an example for establishing a minimum incision width.

FIG. 6 illustrates the mathematical evaluation of the established widths of the incisions. Different focal position movements are given in mm on the X axis. The crosses 40 represent the incision widths established for the adjusted focal positions. The measured incision widths 40 were fit with the curve 41. From the minimum of the curve 41, the minimal cutting gap width or the incision with the smallest width and the associated focal position can be determined. In the present example, the minimal width of an incision is at the location 42 or between the measurement locations 42 and 44, although the measurement location 43 or the established incision width 43 is smaller. However, since this value is far from the curve 41, it can be seen that this established width does not correspond to the remaining widths, that is to say, it clearly deviates from the calculated curve 41. This width can therefore be disregarded in the evaluation. As a result of the assessment of the precision of the curve fit, the measurement quality can further be verified.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining a reference focal position of a laser beam for processing a workpiece that is a plate-like member, the method comprising:
producing at least two incisions in the workpiece with the laser beam set at a first laser power and at different focal positions for at least two of the incisions;
irradiating the workpiece with the laser beam at a second laser power lower than the first laser power;

detecting edges of the incisions by measuring one or more parameters of process radiation, one or more parameters of reflected laser radiation, or one or more parameters of both process radiation and reflected laser radiation caused by the irradiation of the workpiece at the second laser power;

establishing a width of each of the at least two incisions using the measured one or more parameters; and fitting a mathematical curve to the established widths at associated different focal positions, determining a minimum of the curve, including between measurement locations of the different focal positions, as a minimal cutting gap width, and setting the associated focal position at the minimum of the curve as a reference focal position of the laser beam.

2. The method of claim 1, comprising moving the laser beam relative to the plate-like member transversely to a longitudinal direction of the incisions.

3. The method of claim 2, comprising moving the laser beam with a constant spacing between a processing head that emits the laser beam and the plate-like member and at a constant speed relative to the workpiece.

4. The method of claim 1, wherein the incisions are produced with a width greater than a single cutting gap width of the laser beam.

5. The method of claim 1, comprising moving the laser beam relative to the plate-like member in opposing directions twice, and detecting only one of the edges of the incision during each movement.

6. The method of claim 5, wherein the second edge of the incision in the movement direction is detected.

7. The method of claim 1, wherein producing the incisions comprises making a first single cutting gap in a longitudinal direction of the incision to be produced, subsequently making a second single cutting gap in a direction transverse to the longitudinal direction and then, making a third single cutting gap in the longitudinal direction but in an opposing direction to the production of the first single cutting gap.

8. The method of claim 1, wherein the edge of an incision is detected when one of the one or more measured parameters exceeds or falls below a first reference value.

9. The method of claim 1, comprising calculating a gradient of the measured parameter and identifying an edge of an incision when the gradient exceeds or falls below a second reference value.

10. The method of claim 1, comprising calculating a gradient of the one or more measured parameters over a plurality of sampling points, calculating a mean value of the gradients, and comparing the mean value with a third reference value, wherein an edge of an incision is detected when the mean value exceeds or falls below the third reference value.

11. The method of claim 1, comprising establishing a reference focal position as the focal position at which the incision with the smallest width was produced.

* * * * *